United States Patent
Feng et al.

(10) Patent No.: US 12,488,676 B2
(45) Date of Patent: Dec. 2, 2025

(54) DETECTION CIRCUIT AND SYSTEM FOR DETECTING DETECTOR REMOVAL FAILURE

(71) Applicant: Gulf Security Technology Company Limited, Hebei (CN)

(72) Inventors: Juan Feng, Hebei (CN); Junling Shao, Hebei (CN); Zhanlin Yang, Hebei (CN)

(73) Assignee: GULF SECURITY TECHNOLOGY CO., LTD., Hebei (CN)

( * ) Notice: Subject to any disclaimer, the term of this patent is extended or adjusted under 35 U.S.C. 154(b) by 92 days.

(21) Appl. No.: 18/598,470

(22) Filed: Mar. 7, 2024

(65) Prior Publication Data

US 2024/0304077 A1 Sep. 12, 2024

(30) Foreign Application Priority Data

Mar. 10, 2023 (CN) .......................... 202310228923.1

(51) Int. Cl.
G08B 29/04 (2006.01)
H02H 1/00 (2006.01)
H02H 3/02 (2006.01)
H02H 3/05 (2006.01)

(52) U.S. Cl.
CPC .......... *G08B 29/04* (2013.01); *H02H 1/0007* (2013.01); *H02H 3/021* (2013.01); *H02H 3/05* (2013.01)

(58) Field of Classification Search
CPC ...... G08B 29/04; H02H 1/0007; H02H 3/021; H02H 3/05
See application file for complete search history.

(56) References Cited

U.S. PATENT DOCUMENTS

| | | | | | |
|---|---|---|---|---|---|
| 3,978,461 | A | * | 8/1976 | DeLime, III | G08B 29/06 340/517 |
| 4,213,196 | A | * | 7/1980 | Kondo | G08B 13/1627 367/94 |
| 5,440,293 | A | * | 8/1995 | Tice | G08B 29/04 340/568.1 |

(Continued)

FOREIGN PATENT DOCUMENTS

| EP | 0991042 A2 * | 4/2000 | .......... G08B 29/043 |
|---|---|---|---|
| GB | 2313690 A * | 12/1997 | .......... G08B 29/043 |

*Primary Examiner* — Chico A Foxx
(74) *Attorney, Agent, or Firm* — CANTOR COLBURN LLP (57) ABSTRACT

The present application relates to a detection circuit for detecting a detector removal fault. The detection circuit comprises: a switching circuit. The switching circuit comprises one or more switching elements; an energy storage element; and a control circuit for controlling the energy storage element to discharge by controlling the one or more switching elements to perform an opening or closing action. The control circuit is configured to cause the energy storage element to discharge based on a first loop if the detector is removed from the diode bases, and to cause the energy storage element to discharge based on the first loop and a second loop including the terminal resistor if the detector is not removed from the diode bases. The control circuit is further configured to detect the detector removal fault based on an output voltage of the area monitoring module during discharge process.

10 Claims, 5 Drawing Sheets

(56) References Cited

U.S. PATENT DOCUMENTS

| | | | | |
|---|---|---|---|---|
| 6,259,363 | B1* | 7/2001 | Payne | G08B 29/043 |
| | | | | 340/508 |
| 6,717,519 | B2* | 4/2004 | Kobayashi | H02S 50/10 |
| | | | | 340/514 |
| 10,305,424 | B2* | 5/2019 | Takeuchi | G01R 31/26 |
| 11,971,003 | B2* | 4/2024 | Liu | H02J 7/0034 |
| 2013/0076315 | A1* | 3/2013 | Liu | H02M 1/32 |
| | | | | 320/166 |
| 2015/0369854 | A1* | 12/2015 | Mednik | G01R 31/2621 |
| | | | | 324/762.09 |
| 2021/0226440 | A1* | 7/2021 | Shen | H02H 7/10 |
| 2023/0054222 | A1* | 2/2023 | Stokman | H02J 1/04 |
| 2024/0364211 | A1* | 10/2024 | Bishnoi | H02M 7/487 |

\* cited by examiner

DETECTION CIRCUIT AND SYSTEM FOR DETECTING DETECTOR REMOVAL FAILURE

TECHNICAL FIELD

The present application relates to the field of fault detection for detectors, more specifically, to a detection circuit for detecting a detector removal fault, a system for detecting a detector removal fault, a detection method for an area monitoring module, and a computer storage medium.

BACKGROUND

An area monitoring module (e.g., DI-M9319) is designed to be connected with a conventional detector, connecting the conventional detector to an addressable system. When any device connected with the area monitoring module reports a fire alarm signal, the area monitoring module transmits the signal to a fire alarm control panel FACP, which generates a fire alarm and displays a module address. The area monitoring module is also suitable for collecting motion or fault signals.

Figure 7:
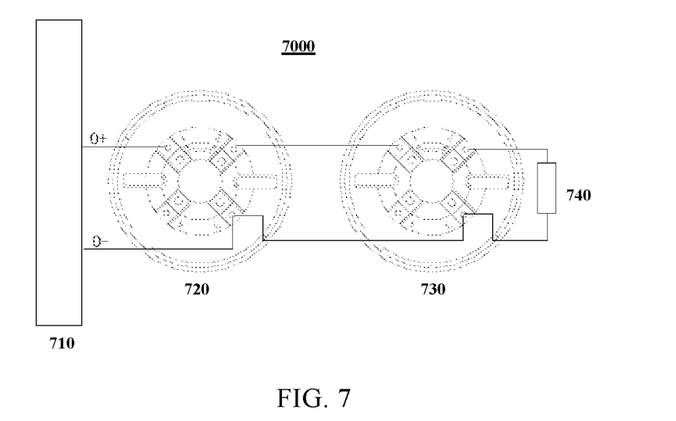
FIGS. 7 and 8 show two existing working models of an area monitoring module.
Figure 8:
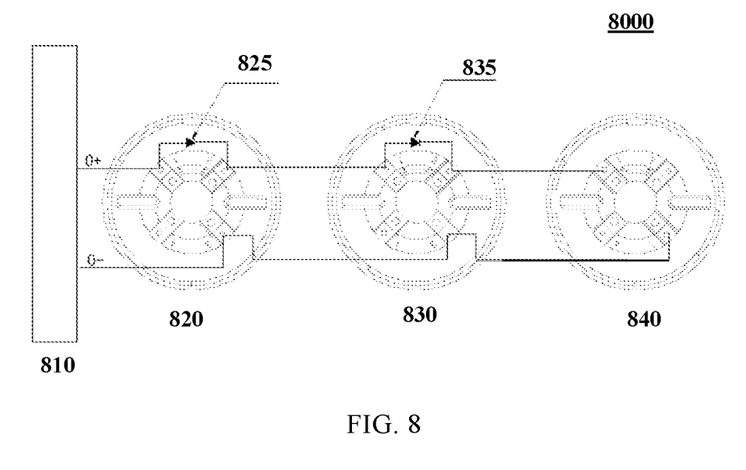

The area monitoring module currently has two working models. The first working model is shown in FIG. 7. In a working model 7000 shown in FIG. 7, an area monitoring module 710 is cascaded with a terminal resistor 740 (the terminal resistor 740 has a resistance value of, for example, 4.7K ohms) via a first standard base 720 and a second standard base 730, respectively. The second working model is shown in FIG. 8. In a working model 8000 shown in FIG. 8, an area monitoring module 810 is cascaded with an active terminal product 840 (e.g., DP-9907) via a first diode base 820 and a second diode base 830, respectively.

The working model of FIG. 7 adopts a combination of "standard base+terminal resistor". In FIG. 7, the area monitoring module 710 may cooperate well with the first standard base 720, the second standard base 730, and the terminal resistor 740 under normal conditions. However, when a detector mounted on the standard base is removed (i.e., when a "detector removal fault" occurs), the subsequent connected detectors may not work properly. For example, when a first detector mounted on the first standard base 720 is removed, a second detector mounted on the second standard base 730 (located after the first detector) does not work properly.

Unlike the implementation of FIG. 7, the working model of FIG. 8 adopts a combination of "diode base+active terminal product". It should be noted that the "diode base" has an additional diode connected between two terminals of the base (e.g., between a first terminal and a second terminal) compared to the "standard base". Furthermore, the terminal resistor 740 of FIG. 7 is replaced with the active terminal product 840. The working model 8000 does not affect other detectors in the event of the detector removal fault. However, the working model 8000 of FIG. 8 is more complicated to implement and cannot accurately identify "detector removal fault" (e.g., it is not possible to distinguish between "detector removal fault" and "open circuit faults"). In addition, due to the use of the active terminal product 840, there is a limit to the number of detectors that can be supported by the working model of FIG. 8 (e.g., no more than 15).

SUMMARY

According to an aspect of the present application, there is provided a detection circuit for detecting a detector removal fault, the detection circuit being provided in an area monitoring module, the area monitoring module being coupled with a terminal resistor via a plurality of diode bases cascaded to each other for mounting a detector, the detection circuit comprising: a switching circuit, the switching circuit comprising one or more switching elements; an energy storage element; and a control circuit for controlling the energy storage element to discharge by controlling the one or more switching elements in the switching circuit to perform an opening or closing action; wherein the control circuit is configured to cause the energy storage element to discharge based on a first loop if the detector is removed from the diode bases, and to cause the energy storage element to discharge based on the first loop and a second loop including the terminal resistor if the detector is not removed from the diode bases, and wherein the control circuit is further configured to detect the detector removal fault based on an output voltage of the area monitoring module during discharge process.

As a supplement or replacement of the foregoing, in the detection circuit, the switching circuit comprises a first switching element SW1, a second switching element SW2, and a third switching element SW3, and the energy storage element comprises a first capacitor C1.

As a supplement or replacement of the foregoing, in the detection circuit, the detection circuit further comprises: a switching diode D2; and a first resistor R1, a second resistor R2, and a fourth resistor R4; wherein one end of the second switching element SW2 is coupled with a first supply voltage Vaa, the other end of the second switching element SW2 is coupled with one end of the switching diode D2; the other end of the switching diode D2 is coupled with one end of the third switching element SW3, the other end of the third switching element SW3 is coupled with one end of the fourth resistor R4, the other end of the fourth resistor is coupled with ground; one end of the first resistor R1 is coupled with ground, the other end of the first resistor is coupled with one end of the first switching element SW1, the other end of the first switching element SW1 is coupled with one end of the second resistor and one end of the first capacitor, respectively, the other end of the second resistor is coupled with a second power supply, and the other end of the first capacitor is grounded.

As a supplement or replacement of the foregoing, in the detection circuit, an output positive port O+ of the area monitoring module is coupled with the switching diode D2 and the third switching element SW3, respectively, and an output negative port O− of the area monitoring module is coupled with the first resistor and the first switching element, respectively; and the control circuit is configured to determine whether the detector is removed based on the output negative port O− of the area monitoring module.

As a supplement or replacement of the foregoing, in the detection circuit, the first loop comprises the first switching element and the first resistor, and the second loop comprises the first switching element, the terminal resistor, a wire resistor R_wire, the third switching element SW3, and the fourth resistor.

As a supplement or replacement of the foregoing, in the detection circuit, a discharge impedance of the first loop is greater than a discharge impedance of the second loop.

According to another aspect of the present application, there is provided a system for detecting a detector removal fault, the system comprising: an area monitoring module, the area monitoring module comprising a detection circuit as described hereinbefore; a first diode base for mounting a first detector, wherein the first diode base is coupled with the area monitoring module; a second diode base for mounting a second detector, wherein the second diode base is coupled with the first diode base; and a terminal resistor, wherein the terminal resistor is coupled with the second diode base.

As a supplement or replacement of the foregoing, in the system, an output positive port of the area monitoring module is coupled with a first terminal of the first diode base, the first terminal of the first diode base is coupled with a positive electrode of a first diode, a negative electrode of the first diode is coupled with a second terminal of the first diode base, the second terminal of the first diode base is coupled with a first terminal of the second diode base, the first terminal of the second diode base is coupled with a positive electrode of a second diode, a negative electrode of the second diode is coupled with a second terminal of the second diode base, the second terminal of the second diode base is coupled with one end of the terminal resistor, the other end of the terminal resistor is coupled with a third terminal of the second diode base, the third terminal of the second diode base is coupled with a third terminal of the first diode base, the third terminal of the first diode base is coupled with an output negative port of the area monitoring module.

According to a further aspect of the present application, there is provided a detection method for an area monitoring module, the area monitoring module comprising a detection circuit as described hereinbefore and being coupled with a terminal resistor via a plurality of diode bases cascaded to each other for mounting a detector, the detection method comprising: periodically closing a first switching element SW1 and a third switching element SW3 in the detection circuit while opening a second switching element SW2 in the detection circuit; sampling a voltage of an output negative port of the area monitoring module; and determine whether there is a detector removal fault based on the voltage of the output negative port.

According to a further aspect of the present application, there is provided a computer storage medium, the medium comprising instructions, the instructions executing a detection method as described hereinbefore at runtime.

DESCRIPTION OF THE DRAWINGS

The above and other aspects and advantages of the present application will be more complete and clear from the following detailed description in conjunction with the accompanying drawings, in which the same or similar elements are denoted by the same reference numerals.

DETAILED DESCRIPTION

The present application is described more fully below with reference to the accompanying drawings, in which illustrative embodiments of the present application are illustrated. However, the present application may be implemented in different forms and should not be construed as limited to the embodiments presented herein. The presented embodiments are intended to make the disclosure herein comprehensive and complete, so as to more comprehensively convey the protection scope of the present application to those skilled in the art.

In this specification, terms such as "comprising" and "including" mean that in addition to units and steps that are directly and clearly stated in the specification and claims, the technical solution of the application does not exclude the presence of other units and steps that are not directly or clearly stated in the specification and claims.

Unless otherwise specified, terms such as "first" and "second" do not indicate the order of the units in terms of time, space, size, etc., but are merely used to distinguish the units.

In this specification, "coupled" should be understood as including a case in which electrical energy or electrical signals are transmitted directly between two units, or a case in which electrical energy or electrical signals are transmitted indirectly through one or more third units.

Figure 2:
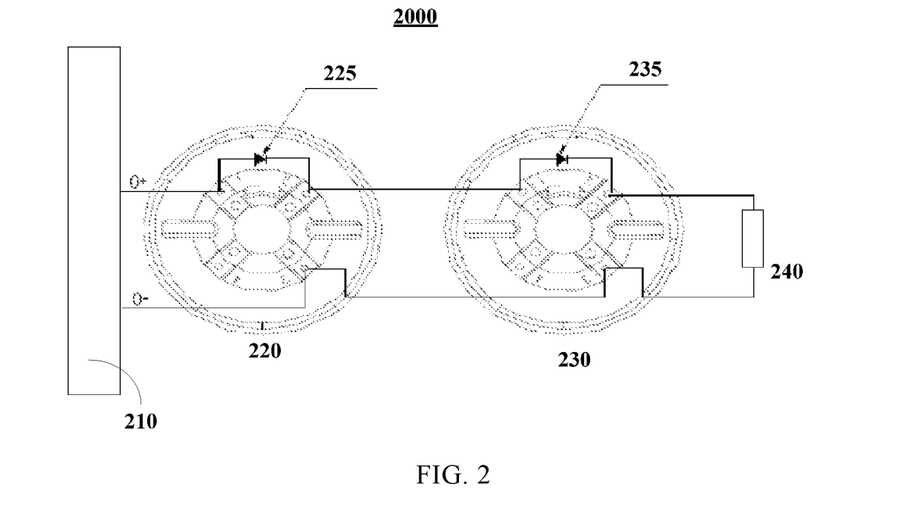
FIG. 2 shows a schematic diagram of a working model of an area monitoring module according to an embodiment of the present application.

In accordance with some embodiments of the present application, an area monitoring module adopts a different working model than that shown in FIGS. 7 and 8, i.e., "diode base+terminal resistor". As shown in FIG. 2, an area monitoring module 210 is coupled with a terminal resistor 240 (e.g., 4.7 k ohms) via a plurality of diode bases (e.g., a first diode base 220 and a second diode base 230 in FIG. 2) cascaded to each other for mounting a detector. As shown in FIG. 2, a first diode 225 is coupled between a first terminal and a second terminal of the first diode base 220, and a second diode 235 is coupled between a first terminal and a second terminal of the second diode base 230.

The inventors of the present application consider adding a detection circuit to the existing area monitoring module under the working model of "diode base+terminal resistor", so as to accurately identify a "detector removal fault" and help locate the fault on site. Furthermore, an entire fault detection process is independent of an active terminal product, which simplifies the circuit terminal design and system installation process. Finally, this working model 2000 is able to support a larger number of detectors than the existing working models 7000 and 8000.

Specific embodiments of the present application are further described below with the aid of the accompanying drawings. It is noted that some non-essential features or circuit elements are not shown in the accompanying drawings in order to more clearly describe what is relevant to the application. However, for those skilled in the art, such omissions do not create difficulties in the implementation of the technical solutions described in the specification of the present application.

Figure 1:
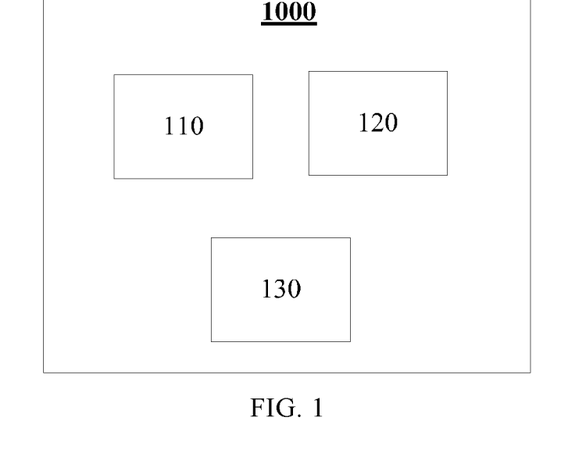
FIG. 1 shows a schematic diagram of a structure of a detection circuit for detecting a detector removal fault according to an embodiment of the present application.

FIG. 1 shows a schematic diagram of a structure of a detection circuit 1000 for detecting a detector removal fault according to an embodiment of the present application. As shown in FIG. 1, the detection circuit 1000 comprises a switching circuit 110, an energy storage element 120, and a control circuit 130. Wherein, the switching circuit 110 comprises one or more switching elements, and the control circuit 130 is used to control the energy storage element 120 to discharge by controlling the one or more switching elements in the switching circuit 110 to perform an opening or closing action.

The detection circuit 1000 in the embodiment of FIG. 1 is provided in an area monitoring module, the area monitoring module is coupled with a terminal resistor via a plurality of diode bases cascaded to each other for mounting a detector. That is, the detection circuit 1000 is used in conjunction with the working model "diode base+terminal resistor" of the area monitoring module. In FIG. 1, the control circuit 130 is configured to cause the energy storage element 120 to discharge based on a first loop if the detector is removed from the diode bases (i.e., a detector removal fault occurs), and to cause the energy storage element 120 to discharge based on the first loop and a second loop including the terminal resistor if the detector is not removed from the diode bases (i.e., a detector removal fault does not occur). And, the control circuit 130 is further configured to detect the detector removal fault based on an output voltage of the area monitoring module during discharge process.

Figure 3:
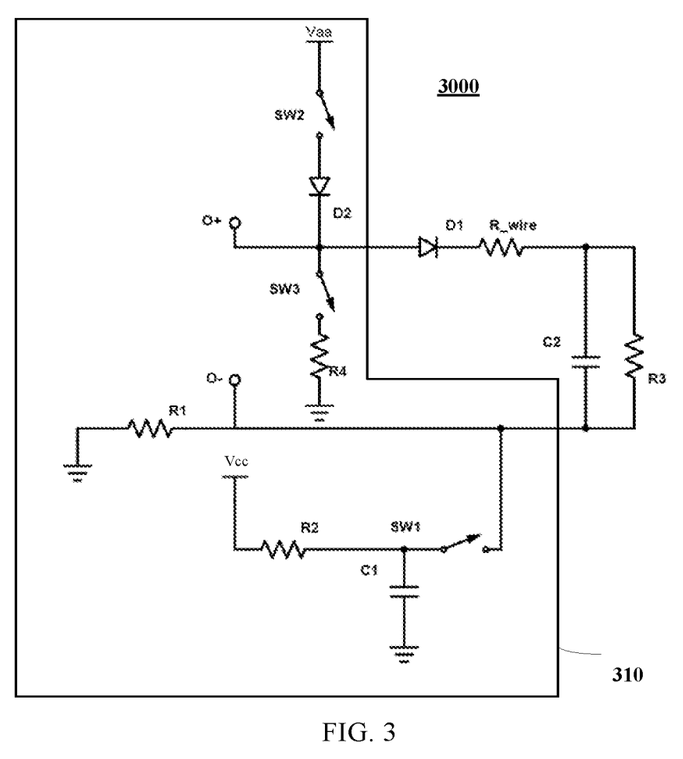
FIG. 3 shows a schematic diagram of a circuit of a system for detecting a detector removal fault according to an embodiment of the present application.

FIG. 3 shows a schematic diagram of a circuit of a system 3000 for detecting a detector removal fault according to an embodiment of the present application. In FIG. 3, the detection circuit in the area monitoring module is indicated by a symbol 310.

In conjunction with FIGS. 1 and 3, the switching circuit 110 may include a first switching element SW1, a second switching element SW2, and a third switching element SW3. The energy storage element 120 may include a first capacitor C1. The control circuit 130 (not shown in FIG. 3) is configured to cause a voltage at both ends of the first capacitor C1 to discharge based on the first loop in the event of the detector removal fault and to cause the voltage at both ends of the first capacitor C1 to discharge based on the first loop and the second loop including the terminal resistor in the absence of the detector removal fault.

In the embodiment of FIG. 3, the detection circuit 310 further comprises: a switching diode D2; and a first resistor R1, a second resistor R2, and a fourth resistor R4; wherein one end of the second switching element SW2 is coupled with a first supply voltage Vaa (which may be used for example to supply power to the area monitoring module), the other end of the second switching element SW2 is coupled with one end of the switching diode D2; the other end of the switching diode D2 is coupled with one end of the third switching element SW3, the other end of the third switching element SW3 is coupled with one end of the fourth resistor R4, the other end of the fourth resistor R4 is coupled with ground; one end of the first resistor R1 is coupled with ground, the other end of the first resistor R1 is coupled with one end of the first switching element SW1, the other end of the first switching element SW1 is coupled with one end of the second resistor R2 and one end of the first capacitor C1, respectively, the other end of the second resistor R2 is coupled with a second power supply Vcc (e.g., +12V), and the other end of the first capacitor C1 is grounded.

It should be noted that the detection circuit 310 in the embodiment of FIG. 3 is only illustrative and not restrictive. A person skilled in the art may make various changes or replacements to the circuit elements therein based on this detection circuit 310, for example, the first resistor R1 may be split into two smaller resistors.

Furthermore, in the embodiment of FIG. 3, the first loop includes the first switching element SW1 and the first resistor R1, and the second loop includes the first switching element SW1, a terminal resistor R3, a wire resistor R_wire, the third switching element SW3, and the fourth resistor R4.

With continued reference to FIG. 3, an output positive port O+ of the area monitoring module is coupled with the switching diode D2 and the third switching element SW3, respectively, and an output negative port O− of the area monitoring module is coupled with the first resistor R1 and the first switching element SW1, respectively. In this way, the control circuit 130 may be configured to determine whether the detector is removed based on the output negative port O− of the area monitoring module.

In the absence of the detector removal fault (i.e. when the detector is correctly mounted on the diode base), for example, when the detector is correctly mounted on the first diode base 220, a first terminal of the first diode base 220 is coupled with its second terminal. That is, the first diode 225 is shorted at this time. Similarly, when the detector is correctly mounted on the second diode base 230, a first terminal of the second diode base 230 is coupled with its second terminal. That is, the second diode 235 is shorted at this time.

In the event of the detector removal fault (i.e. when the detector is not correctly mounted on the diode base or is removed), for example, when the detector is removed from the first diode base 220, the first diode 225 is not shorted at this time. In FIG. 3, a diode D1 means the first diode 225 that is connected to the circuit when the detector is removed from the first diode base 220 or the second diode 235 that is connected to the circuit when the detector is removed from the second diode base 230.

Due to the presence of the diode D1 (based on the unidirectional conductivity of the diode D1), the discharge loop of the first capacitor C1 (i.e., the first loop) will not be identical to the discharge loop in the absence of the diode D1 (i.e., the first and the second loops).

Figure 4:
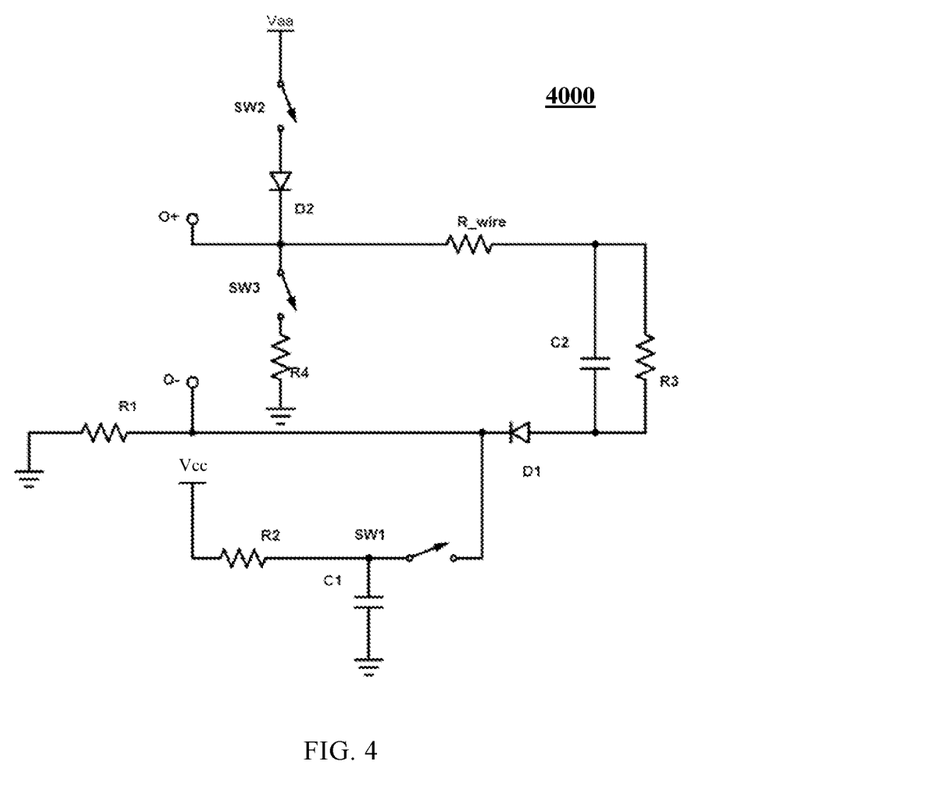
FIG. 4 shows a schematic diagram of a circuit of a system for detecting a detector removal fault according to another embodiment of the present application.
Figure 5:
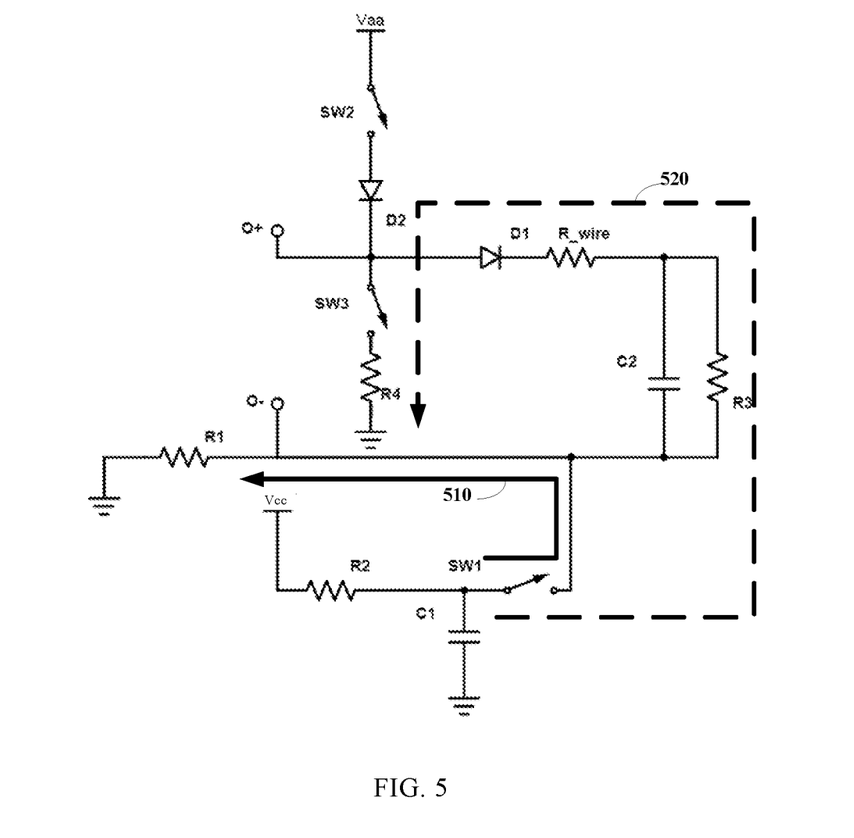
FIG. 5 shows different discharge loops of a system for detecting a detector removal fault according to an embodiment of the present application.

FIG. 5 shows different discharge loops of a system for detecting a detector removal fault according to an embodiment of the present application. As shown in FIG. 5, a first loop 510 includes a first switching element SW1 and a first resistor R1, and a second loop 520 includes the first switching element SW1, a terminal resistor R3, a wire resistor R_wire, a third switching element SW3, and a fourth resistor R4. In addition, it is to be noted that, in the embodiments of FIGS. 3 to 5, R_wire denotes an equivalent resistance of the connected wire, and C2 denotes an equivalent capacitance in the loop.

In an embodiment, the resistance value of each resistor is suitably set so that a discharge impedance of the first loop 510 is much larger than a discharge impedance of the second loop 520 (e.g., the discharge impedance of the first loop 510 is more than ten times the discharge impedance of the second loop 520). In this way, the inconsistency of the voltage value of the first capacitor C1 (which may be derived by sampling the voltage value of the output negative port O− of the area monitoring module) is more pronounced under different discharge loops, which is conducive to the control circuit 130 to detect the detector removal fault based on the output voltage of the area monitoring module during discharge process.

In conjunction with FIGS. 2 and 3, in an embodiment, a system for detecting a detector removal fault may comprise: an area monitoring module 210, the area monitoring module 210 comprising a detection circuit 310; a first diode base 220 for mounting a first detector (not shown), wherein the first diode base 220 is coupled with the area monitoring module 210; a second diode base 230 for mounting a second detector (not shown), wherein the second diode base 230 is coupled with the first diode base 220; and a terminal resistor 240, wherein the terminal resistor 240 is coupled with the second diode base 220.

In an embodiment, in the above-mentioned system, an output positive port O+ of the area monitoring module is coupled with a first terminal of the first diode base 220, the first terminal of the first diode base 220 is coupled with a positive electrode of the first diode 225, a negative electrode of the first diode 225 is coupled with a second terminal of the first diode base 220, the second terminal of the first diode base 220 is coupled with a first terminal of the second diode base 230, the first terminal of the second diode base 230 is coupled with a positive electrode of the second diode 235, a negative electrode of the second diode 235 is coupled with a second terminal of the second diode base 230, the second terminal of the second diode base 230 is coupled with one end of the terminal resistor 240, the other end of the terminal resistor 240 is coupled with a third terminal of the second diode base 230, the third terminal of the second diode base 230 is coupled with a third terminal of the first diode base 220, the third terminal of the first diode base 220 is coupled with an output negative port O− of the area monitoring module 210.

FIG. 4 shows a schematic diagram of a circuit of a system 4000 for detecting a detector removal fault according to another embodiment of the present application. Slightly different from the schematic diagram of the circuit of FIG. 3, a negative electrode (cathode) of a diode D1 is directly coupled with an output negative port O− of the area monitoring module, and a positive electrode (anode) of the diode D1 is coupled with an output positive port O+ of the area monitoring module via a terminal resistor R3, a wire resistor R_wire, and the like. Furthermore, in the embodiment of FIG. 4, a first loop includes a first switching element SW1 and a first resistor R1, and a second loop includes the first switching element SW1, the terminal resistor R3, the wire resistor R_wire, a third switching element SW3, and a fourth resistor R4. The principle of detecting a detector removal fault utilizing the system 4000 of FIG. 4 is the same as that of the system 3000 of FIG. 3, and will not be described herein.

Figure 6:
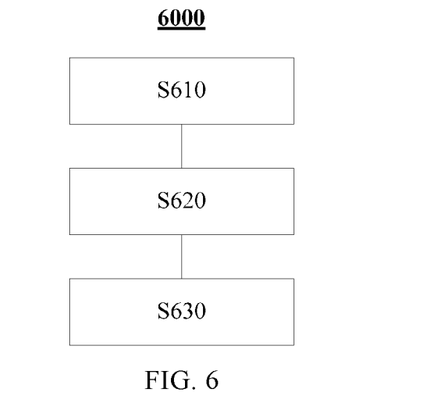
FIG. 6 shows a detection method for an area monitoring module according to an embodiment of the present application.

FIG. 6 shows a detection method 6000 for an area monitoring module according to an embodiment of the present application. The detection method 6000 may comprise the following steps:

In step S610, periodically (e.g. every 20 ms) closing the first switching element SW1 and the third switching element SW3 while opening the second switching element SW2;

in step S620, sampling a voltage of the output negative port O− of the area monitoring module; and in step S630, determine whether there is a detector removal fault based on the voltage of the output negative port.

The detection method 6000 effectively detects the detector removal fault by controlling individual switching elements in the switching circuit so that different discharge loops are generated based on the presence or absence of the detector removal fault, and subsequently by sampling the voltage of the output negative port O− of the area monitoring module and utilizing the inconsistency of the voltage of the output negative port caused by the different discharge loops.

It will be readily appreciated by those skilled in the art that the detection method 6000 for the area monitoring module provided by the above embodiments of the present application may be implemented by a computer program. For example, the computer program is contained in a computer program product, and the computer program is executed by a processor to implement the detection method 6000 for the area monitoring module. For example, when a computer storage medium (e.g., a USB flash drive) storing the computer program is connected to a computer, the computer program may be run to execute the detection method 6000 for the area monitoring module provided by one or more embodiments of the present application.

In summary, the detector removal fault detection scheme of the embodiments of the present application proposes a new working model of the area monitoring module, i.e., "diode base+terminal resistor", and adds the detection circuit to the existing area monitoring module so as to accurately identify a "detector removal fault" and help locate the fault on site. Furthermore, an entire fault detection process is independent of an active terminal product, which simplifies the circuit terminal design and system installation process. Finally, the detector removal fault detection scheme of the embodiments of the present application is able to support a larger number of non-coded devices compared to existing schemes.

The above examples primarily illustrate the detector removal fault detection scheme of the embodiments of the present application. Although only some of these embodiments of the present application are described, it should be appreciated by those of ordinary skill in the art that the present application may be implemented in many other forms without departing from the spirit and scope thereof. Accordingly, the examples and embodiments presented are to be regarded as illustrative and not restrictive, and various modifications and substitutions may be covered by the application without departing from the spirit and scope of the application as defined by the appended claims.

The invention claimed is:

1. A detection circuit for detecting a detector removal fault, characterized in that the detection circuit being provided in an area monitoring module, the area monitoring module being coupled with a terminal resistor via a plurality of diode bases cascaded to each other for mounting a detector, the detection circuit comprising:
    a switching circuit, the switching circuit comprising one or more switching elements;
    an energy storage element; and
    a control circuit for controlling the energy storage element to discharge by controlling the one or more switching elements in the switching circuit to perform an opening or closing action;
    wherein the control circuit is configured to cause the energy storage element to discharge based on a first loop if the detector is removed from the diode bases, and to cause the energy storage element to discharge based on the first loop and a second loop including the terminal resistor if the detector is not removed from the diode bases, and
    wherein the control circuit is further configured to detect the detector removal fault based on an output voltage of the area monitoring module during discharge process.

2. The detection circuit of claim 1, wherein the switching circuit comprises a first switching element SW1, a second switching element SW2, and a third switching element SW3, and the energy storage element comprises a first capacitor C1.

3. The detection circuit of claim 2, wherein the detection circuit further comprises:
    a switching diode D2; and a first resistor R1, a second resistor R2, and a fourth resistor R4;

wherein one end of the second switching element SW2 is coupled with a first supply voltage Vaa, the other end of the second switching element SW2 is coupled with one end of the switching diode D2; the other end of the switching diode D2 is coupled with one end of the third switching element SW3, the other end of the third switching element SW3 is coupled with one end of the fourth resistor R4, the other end of the fourth resistor is coupled with ground;

one end of the first resistor R1 is coupled with ground, the other end of the first resistor is coupled with one end of the first switching element SW1, the other end of the first switching element SW1 is coupled with one end of the second resistor and one end of the first capacitor, respectively, the other end of the second resistor is coupled with a second power supply, and the other end of the first capacitor is grounded.

4. The detection circuit of claim 3, wherein an output positive port O+ of the area monitoring module is coupled with the switching diode D2 and the third switching element SW3, respectively, and an output negative port O− of the area monitoring module is coupled with the first resistor and the first switching element, respectively; and the control circuit is configured to determine whether the detector is removed based on the output negative port O− of the area monitoring module.

5. The detection circuit of claim 4, wherein the first loop comprises the first switching element and the first resistor, and the second loop comprises the first switching element, the terminal resistor, a wire resistor R_wire, the third switching element SW3, and the fourth resistor.

6. The detection circuit of claim 5, wherein a discharge impedance of the first loop is greater than a discharge impedance of the second loop.

7. A system for detecting a detector removal fault, characterized by comprising:

an area monitoring module, the area monitoring module comprising the detection circuit as claimed in claim 1;
a first diode base for mounting a first detector, wherein the first diode base is coupled with the area monitoring module;
a second diode base for mounting a second detector, wherein the second diode base is coupled with the first diode base; and
a terminal resistor, wherein the terminal resistor is coupled with the second diode base.

8. The system of claim 7, wherein an output positive port of the area monitoring module is coupled with a first terminal of the first diode base, the first terminal of the first diode base is coupled with a positive electrode of a first diode, a negative electrode of the first diode is coupled with a second terminal of the first diode base, the second terminal of the first diode base is coupled with a first terminal of the second diode base, the first terminal of the second diode base is coupled with a positive electrode of a second diode, a negative electrode of the second diode is coupled with a second terminal of the second diode base, the second terminal of the second diode base is coupled with one end of the terminal resistor, the other end of the terminal resistor is coupled with a third terminal of the second diode base, the third terminal of the second diode base is coupled with a third terminal of the first diode base, the third terminal of the first diode base is coupled with an output negative port of the area monitoring module.

9. A detection method for an area monitoring module, characterized in that the area monitoring module comprising a detection circuit as claimed in claim 4 and being coupled with a terminal resistor via a plurality of diode bases cascaded to each other for mounting a detector, the detection method comprising:

periodically closing a first switching element SW1 and a third switching element SW3 in the detection circuit while opening a second switching element SW2 in the detection circuit;
sampling a voltage of an output negative port of the area monitoring module; and
determine whether there is a detector removal fault based on the voltage of the output negative port.

10. A non-transitory computer storage medium, the medium comprising instructions, characterized in that the instructions execute the method as claimed in claim 9 at runtime.

* * * * *